United States Patent [19]

Galasko et al.

[11] Patent Number: 4,578,992

[45] Date of Patent: Apr. 1, 1986

[54] DETECTION OF A LOW PRESSURE CONDITION OF A VEHICLE TIRE

[75] Inventors: Philip E. Galasko, 3 The Boulders, Khyber Rock, Sandton, Transvaal; Frans J. Kruger, Pretoria, both of South Africa

[73] Assignee: Philip E. Galasko, Sandton, South Africa

[21] Appl. No.: 624,716

[22] Filed: Jun. 26, 1984

Related U.S. Application Data

[63] Continuation-in-part of Ser. No. 439,532, Nov. 5, 1982, abandoned.

[51] Int. Cl.[4] .............................................. B60C 23/02
[52] U.S. Cl. ...................................... 73/146.5; 340/58
[58] Field of Search ........................... 73/146.5, 146.2; 340/58, 870.16

[56] References Cited

U.S. PATENT DOCUMENTS

| 3,662,335 | 5/1972 | Fritze | 200/61.25 |
| 4,467,641 | 8/1984 | Abraham | 73/146.5 |
| 4,529,961 | 7/1985 | Nishimura et al. | 73/146.5 |

Primary Examiner—Donald O. Woodiel
Attorney, Agent, or Firm—Ladas & Parry

[57] ABSTRACT

A tire pressure indicating device includes a coil, and mounted in a tire forming with a capacitor to form a passive oscillatory circuit. The circuit is energized by pulses supplied via a coil positioned outside the tire and secured to the vehicle and the frequency in the passive oscillatory circuit is varied with tire pressure due to changes caused to the capacitance value of the capacitor. The frequency in the passive oscillatory circuit is sensed via a coil positioned outside the tire and secured to the vehicle.

9 Claims, 11 Drawing Figures

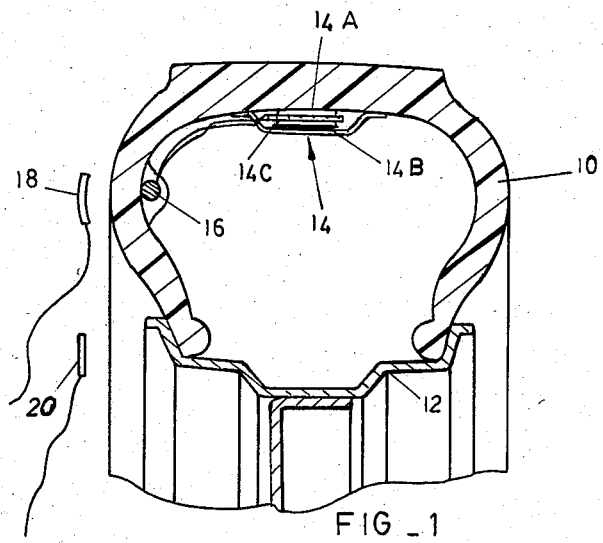
FIG_1
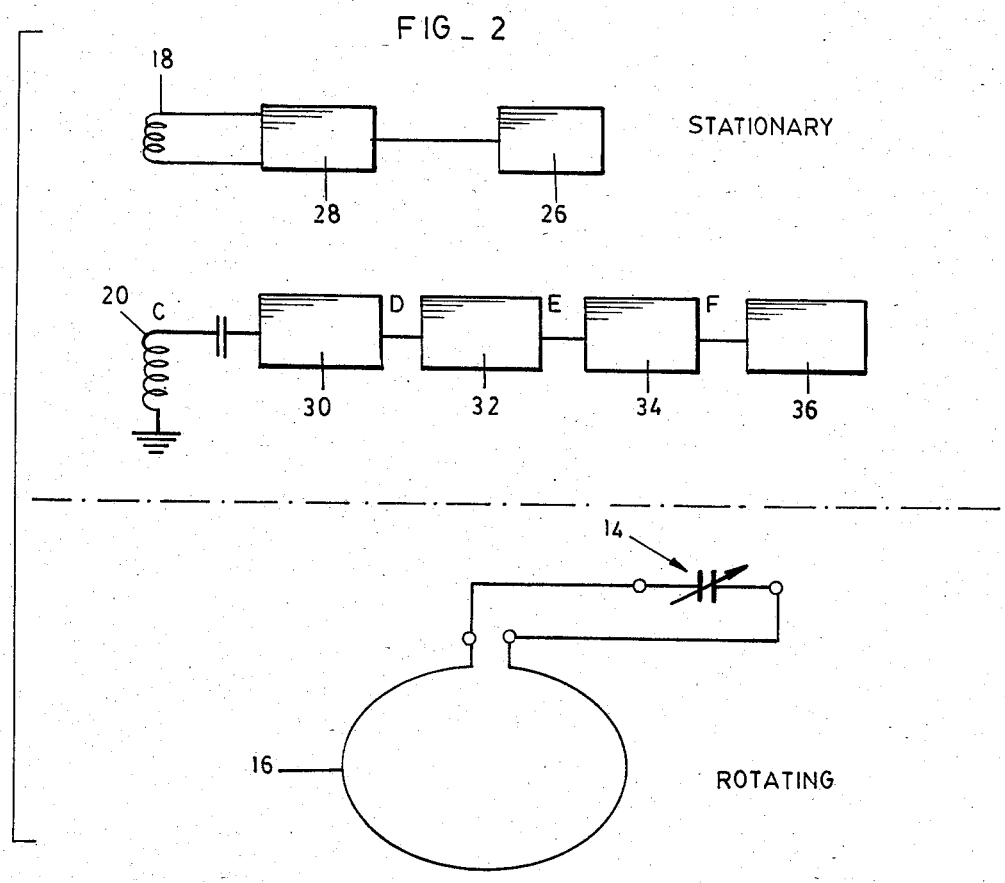
FIG_2

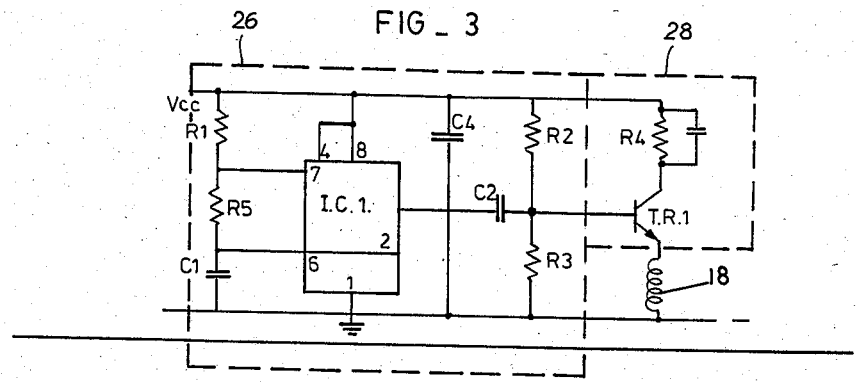
FIG_3
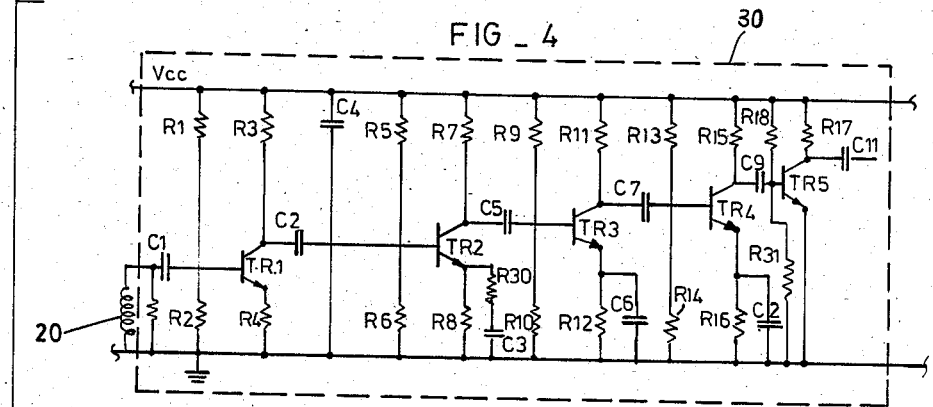
FIG_4
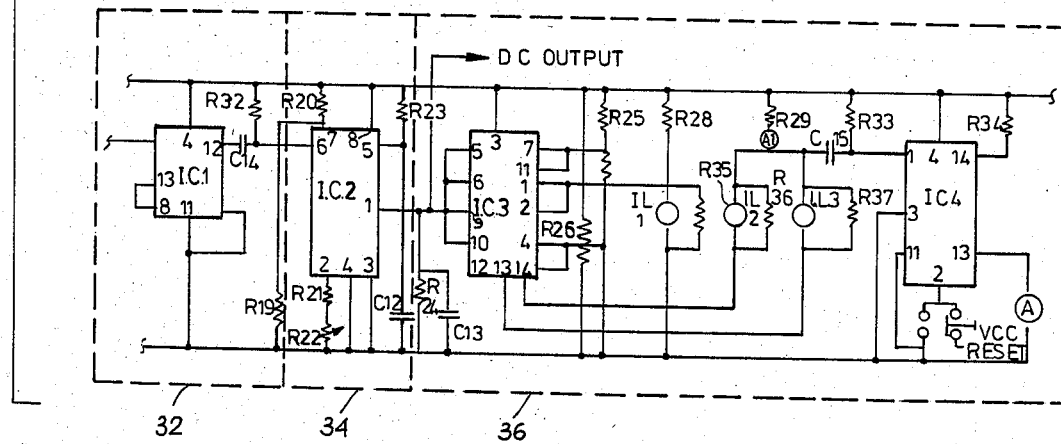

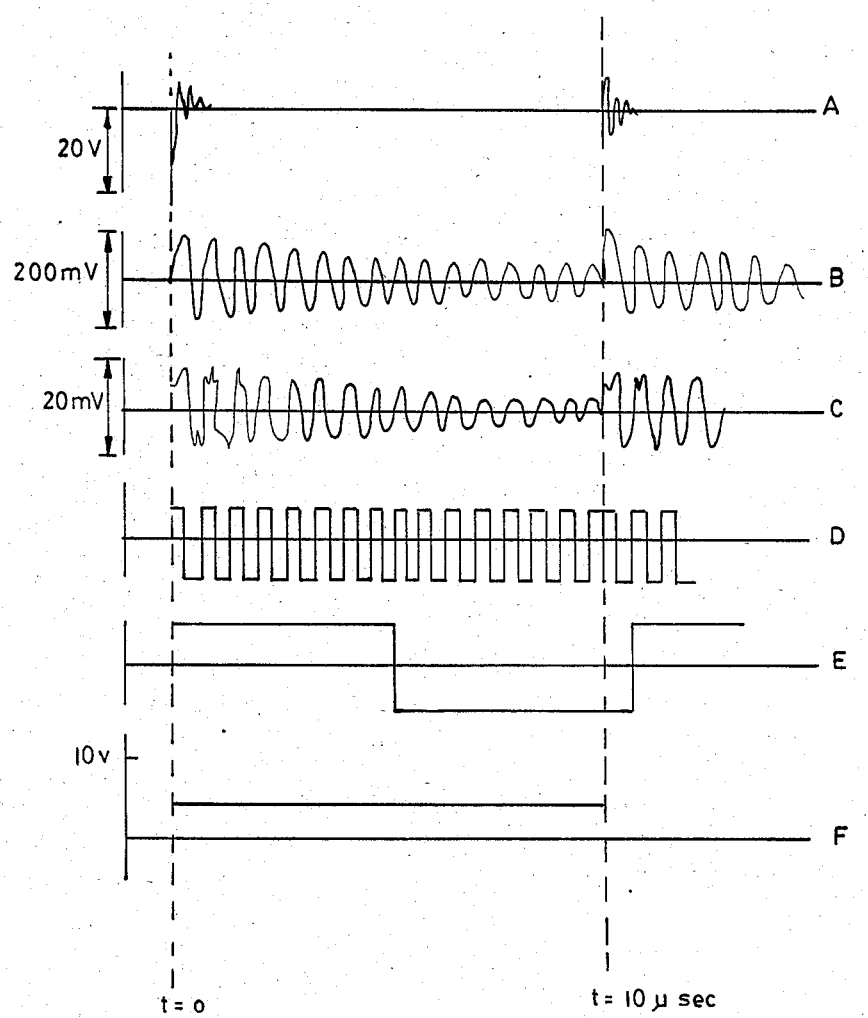
FIG _ 5

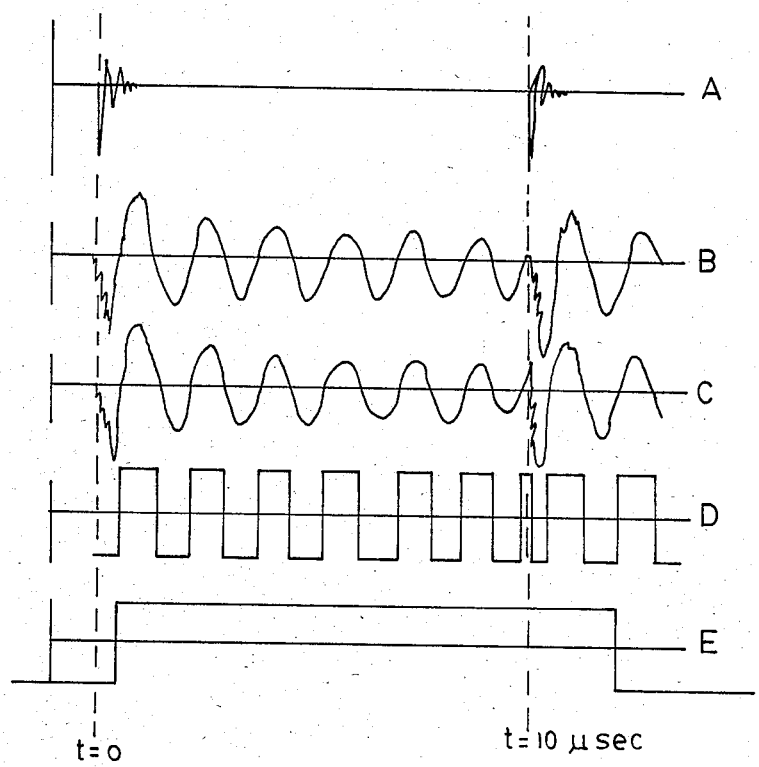
FIG_6
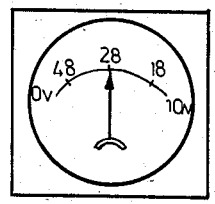
FIG_7

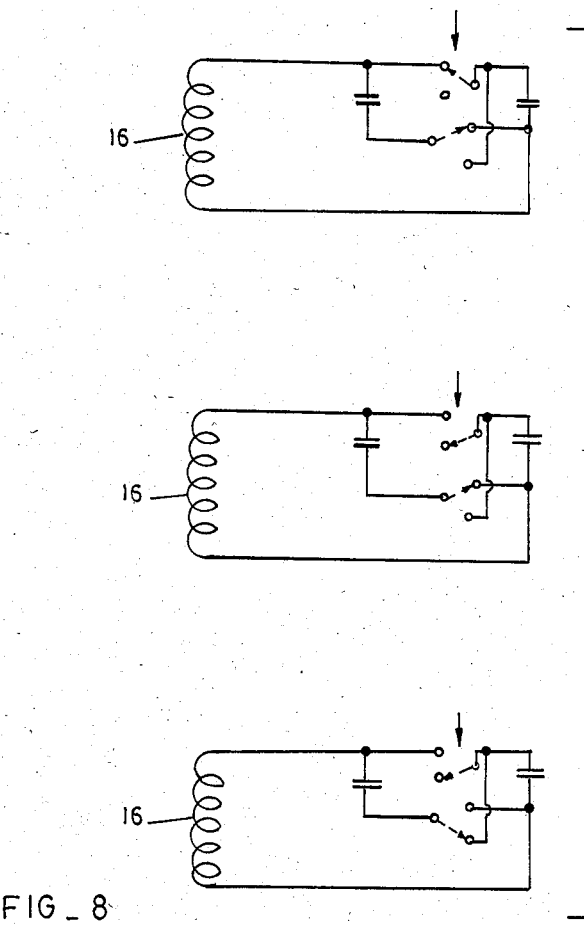
FIG_8
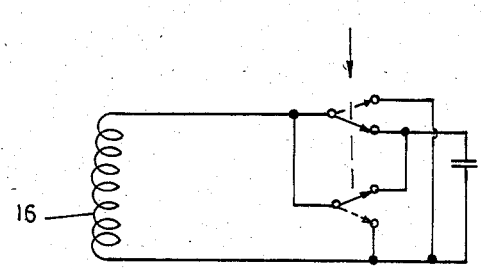
FIG_9

FIG_10
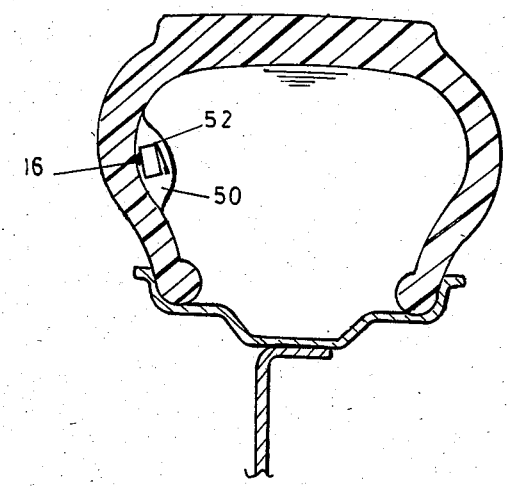
FIG_11
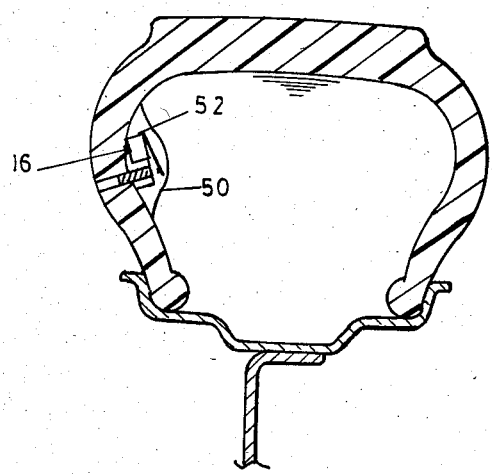

DETECTION OF A LOW PRESSURE CONDITION OF A VEHICLE TIRE

This application is a continuation-in-part of U.S. Ser. No. 439,532, filed on Nov. 5, 1982, which is now abandoned.

BACKGROUND OF THE INVENTION

The invention relates generally to detecting conditions of rotatable members and has particular application to detecting the pressure of a vehicle tire.

A number of patent specifications have addressed the problem of detecting and indicating the pressure of a vehicle tire. These documents disclose methods of using the variations in tire pressure to modify one or more parameters of a resonant circuit which is attached to the vehicle wheel. In many of those cases, resonant primary, secondary or receiving circuits are used, at least two such circuits being electrically closely coupled. For example UK No. 2 065 898, UK No. 2 069 209, U.S. Pat. No. 2,274,557, U.S. Pat. No. 3,662,335 and European application No. 0 045 401 disclose systems having closely coupled circuits. Such closely coupled circuits, or mutually tuned circuits, have the disadvantage that characteristics of the electrical signals generated by the circuits such as their bandwidth and amplitude are dependent on this coupling, which is in turn dependent on the distance between the circuits. The results is that these parameters of the electrical signals vary undesirably with variations in the distance between the circuits, which increases the difficulty of obtaining accurate and reliable measurements. French Pat. No. 2 344 007 discloses an arrangement employing an FM transmitter on the wheel.

SUMMARY OF THE INVENTION

According to the invention there is provided a tire pressure device which comprises a passive electrical oscillatory circuit mounted in the tire and tire pressure responsive means positioned in the tire arranged to adjust the natural frequency of oscillation of the circuit in response to changes in the tire pressure; coil means secured to the vehicle and positioned adjacent the tire for exciting the passive oscillatory circuit including a pulse generator arranged to produce electrical pulses in the coil means at a repetition rate much lower than the natural frequency of the passive oscillatory circuit; and a frequency detector circuit secured to the vehicle including coil means positioned adjacent the tire to sense the frequency of oscillation of the passive oscillatory circuit and to provide an output signal corresponding to the tire pressure.

The tire pressure is sensed by a device which is arranged to adjust a capacitive component of the passive oscillatory circuit.

The oscillatory circuit can have separate capacitive devices arranged to be selectively switched into the oscillatory circuit and the pressure sensing device is arranged to control the selective switching.

The output signal may be arranged to produce a warning signal whenever its value differs from a predetermined value or range of values. Such a signal may be a visual signal and/or an audible signal.

In indicating devices of the present invention the passive oscillatory circuit is excited without causing undesirable interference between the exciting energy and the oscillations of the passive oscillatory circuit. This is accomplished on the one hand by using coupling circuits having small coefficients of coupling, that is the coupling circuits are not closely coupled. Even so the frequency detector circuit is able to pick up and respond to flux changes caused by the passive oscillatory circuit to detect the natural frequency of the passive oscillatory circuit as required. On the other hand the exciting energy is provided in the form of single pulses transmitted at intervals many times greater than the oscillations of the passive oscillatory circuit. This means that errors in the detection of the natural frequency can be eliminated and direct interference between the excitation energy source and the detecting circuit is not produced and/or need not be catered for.

As mentioned above, in the prior art, primary windings, secondary windings and receiving circuit windings are provided, at least two of which are closely coupled, and the secondary winding being fixed to rotate with the wheel. Mutual inductance in the close coupled windings means that in cases where the frequency at any time in the secondary winding relates to the parameter to be measured, the close coupling interferes with the measurements to be made. Because in mutually tuned circuits the degree of coupling is directly proportional to the separation between windings, if this separation varies in use undesirable an unpredictable variation in amplitude and bandwidth occur. In applications such as tire pressure indicating and warning devices this is likely to happen in practice and represent a serious disadvantage. In embodiments of this invention, the coefficient of coupling is made deliberately small and therefore becomes unimportant. In fact, the passive oscillatory circuit, rotating with the wheel, can be treated as an isolated circuit. The natural frequency at any time of the oscillatory circuit, which is dependent on tire pressure, can be detected in a manner which is independent of amplitude, coefficient of coupling or feedback and any other variations normally associated with the physical and electrical requirements of maintaining a stable or predictable relationship between mutually coupled windings.

As mentioned earlier, in embodiments of the invention pulsed excitation is also used for driving the passive oscillatory circuit. The pulses are at a 'frequency' much less than the natural frequency of the passive oscillatory circuit. For example in the preferred embodiment the 'frequency' of the pulses is one sixteenth the natural frequency of the passive oscillatory circuit. In fact, the pulses may provided at greater intervals and need not be produced in 'in phase' with the oscillations of the passive oscillatory circuit.

In mutually coupled or closely coupled circuits the frequency of the energising signals are often the same as the natural frequency of the passive oscillatory circuit and are essentially in phase with the oscillations of the oscillatory circuit.

The detecting circuit is normally positioned so that coupling between the energising circuit and the detecting circuit is a minimum distance but of course the tire must be free at all times to rotate without fouling the stationary coils. Naturally the separation between the coils will vary to some extent as the vehicle is driven along the road but as stated above variations in separation does not affect the satisfactory operation of the device. It will be noted also that if the detecting circuit is energised directly and inadvertently by the energising pulses, the relatively infrequent occurrence can easily be distinguished electrically from the natural frequency oscillation signals picked up for determination of the frequency thereof in the passive oscillatory circuit.

BRIEF DESCRIPTION OF THE DRAWINGS

Tire pressure measuring devices according to the invention will now be described by way of example with reference to the accompanying drawings in which:

FIG. 1 is a cross-section of part of a tire showing schematically part of the device;

FIG. 2 is a block circuit diagram of the device;

FIGS. 3 and 4 are circuit diagrams of parts of the device;

FIG. 5 is a representation of the signals at various points in the device during operation thereof, at one operating frequency;

FIG. 6 is a representation of the signals at various points in the device during operation thereof, at a lower operating frequency;

FIG. 7 shows a 0-10 volt voltmeter calibrated to indicate tire pressure;

FIGS. 8 and 9 show circuit diagrams of part of the circuit of the device; and

FIGS. 10 and 11 are further cross-sectional views of the tire.

DESCRIPTION OF A PREFERRED EMBODIMENT

Referring to the drawings, in FIG. 1 a vehicle tire 10 is mounted on a rim 12 to which is fitted an air pressure sensing device 14 attached to the tire in the form of two capacitor plates 14A and 14B separated by a layer of elastic dielectric material 14C. The device 14 is electrically connected to an inductance coil 16 extending around the inside wall of the tire 10. The coil 16 is positioned generally midway between the rim 12 and the tread of the tire 10 at the widest part of the tire 10. A transmitting or energising inductance coil 18 and receiving inductance coil 20 are attached to a fixed (non-rotatable) structural member (not shown) of the vehicle. The coils 16, 18 and 20 are positioned so as to be loosely coupled.

In FIG. 2, a passive oscillatory circuit which comprises the capacitor device 14 and the coil 16 are shown on the rotating part of the drawing. The inductance coil 18 is driven by a pulse generator 26 via an amplifier 28, the repetition rate of the pulses being much lower than the natural frequency of oscillation of the passive oscillatory circuit. The inductance coil 20 is connected to a series circuit comprising an amplifier 30, a divider circuit 32, a frequency-to-direct current voltage convertor 34 and a comparator/indicator circuit 36.

In use, whether the vehicle tire is stationary or rotating, the passive oscillatory circuit is inductively energised by pulses generated by the pulse generator 26 and transmitted by the coil 18. The passive oscillatory circuit oscillates at its natural frequency, the value of which depends on capacitive value of the device 14 in series with the coil 16, the frequency being given by the expression $$f = \frac{1}{2\pi \sqrt{LC}},$$

and the waveform produced in the passive oscillatory circuit by the exciting pulses takes the general form $f(t) = 1/\omega e^{-\alpha t} \sin \omega t$, where $\alpha$ is the attenuation constant of the circuit.

FIGS. 5 and 6 show at A and B the exciting pulses and the naturally decaying waveform of the passive oscillatory circuit, respectively. The frequency of oscillation is sensed by inductive coupling between the coils 16 and 20 and the frequency of oscillation is detected by the circuits 30, 32, 34 and 36 to provide an output corresponding to that frequency. According to the chosen range of values of the capacitor device 14, the indicated pressure can be made to correspond directly to the pressure of the tire. At C is shown the received signal at the coil 20, while D shows the amplified and conditioned signal after it has passed through the receiving amplifier 30. It can be seen that the frequency information is retained. At E is shown the signal after processing by the frequency divider circuit 32. The original frequency of, for example 1,6 MHz must be divided to a frequency in the range below 100 kHz, which is the practical upper frequency limit for commercially or generally available frequency to voltage convertors. At F in FIG. 5 is shown the DC voltage corresponding to the received frequency. This voltage is supplied to a meter such as that shown in FIG. 7, and the meter can be calibrated to read pressure directly.

If the tire pressure falls to an unsatisfactory low level, the detected frequency that corresponds to a low tire pressure causes an output signal at the circuit 36 which can be used to generate a visual or audible warning to the driver of the vehicle. As an alternative in FIG. 9 the device can be arranged so that there is a fixed value capacitor, which is short-circuited by a pressure sensing switching device when the tire pressure drops below or exceeds a predetermined level, thereby in turn causing actuation of an alarm.

In other embodiments, two or more fixed value capacitors are employed in place of a single fixed or variable capacitor. Whereas capacitance of the variable capacitor varies with the pressure of the air in the tire, with a resulting change in the natural resonant frequency of the circuit 16, a tire pressure responsive switching arrangement is used to switch the fixed capacitors into and out of circuit with the coil 16 as required. The circuits of such switched capacitors are shown in FIG. 8.

FIG. 3 shows the pulse transmitter circuit 26 in detail. The circuit includes a pulse generator IC such as an astable multivibrator which is configured to produce a 1 micro second pulse every 10 micro seconds.

The pulse width is thus sufficiently smaller than the period between pulses that the pulses do not cause appreciable errors in the measurement of the frequency from the rotating member. The amplifier 28 consists of a single stage transistor driver amplifier TR 1 arranged to drive transmitting coil 18. The pulse generator 26 and the amplifier 28 are mounted in the same housing as the receiver circuit in the cab of the vehicle. Transmitting coil 18 is connected to TR 1 by means of a coaxial cable (not shown). Coil 18 is mounted on the frame of the vehicle adjacent to the road wheel diagonal to the coil 16 inside the tire. Coils 16 and 18 are loosely coupled to ensure a small coefficient of coupling.

FIG. 4 shows the amplifier 30 which is a high gain wide band transistor amplifier incorporating TR 1, TR 2, TR 3, TR 4, and TR 5. The divider 32 is a 4 bit binary counter IC and the frequency-to-direct current voltage converter 34 comprises a precision frequency-to-voltage converter IC 2. The circuit 36 includes a voltage comparator circuit with alarm threshold adjustment IC 3, status indication lamps IL 1, IL 2, and IL 3, and audio alarm latching and rest circuit IC 4. The coil 20 is mounted on a member of the vehicle adjacent to the inside wall of the tire and loosely coupled with coil 16 mounted inside the tire. Coil 20 is connected to the receiver circuit mounted in the cab of the vehicle by means of a coaxial cable (not shown).

The circuit of FIG. 4 is shown in two parts for clarity. In practice, the circuit is built on a single board.

We claim:

1. A tire pressure indicating device which comprises mounted on a tire a passive electrical oscillatory circuit, tire pressure responsive means positioned in the tire arranged to adjust the natural frequency of oscillation of the circuit in response to changes in the tire pressure; coil means secured to the vehicle and positioned adjacent the tire for exciting the passive oscillatory circuit including a pulse generator arranged to produce electrical pulses in the coil means at a repetition rate much lower than the natural frequency of the passive oscillatory circuit; and a frequency detector circuit secured to the vehicle including coil means positioned adjacent the tire to sense the frequency of oscillation of the passive oscillatory circuit and to provide an output signal corresponding to the tire pressure.

2. A device according to claim 1 in which the tire pressure responsive means is arranged to adjust a capacitive component of the passive oscillatory circuit.

3. A device according to claim 2, in which the capacitive component comprises at least two separate capacitors electrically connected to a coil of the passive oscillatory circuit and the tire pressure responsive device comprises a switch which is operated when the tire pressure varies beyond a predetermined value to alter the connections of the capacitors to the coil.

4. A device according to claim 3, in which the switch includes means for adjusting its operating characteristics, and a sealed aperture in the wall of the tire to provide access to the adjusting means.

5. A device according to claim 1 in which the output signal is arranged to produce a warning signal whenever its value falls outside a range of predetermined values.

6. A device according to claim 1 in which the passive oscillatory circuit comprises a coil which extends around the tire and is fixed to an inside wall of the tire.

7. A device according to claim 6, in which the coil is secured mid-way between the rim of the tire and the tread of the tire.

8. A device according to claim 1 in which the frequency detector circuit includes two coil means connected in parallel which are radially displaced around the circumference of the tire.

9. A tire pressure indicating device which comprises a passive electrical oscillatory circuit mounted inside the tire including a coil secured to an inside wall of the tire and extending around the tire, a pressure responsive means mounted in the tire arranged to adjust the natural frequency of the passive oscillatory circuit in response to changes in tire prssure; an electrical energising coil mounted on the vehicle and positioned adjacent the outside of the tire opposite the coil of the passive oscillatory circuit for exciting that circuit, a drive circuit for the energising coil including a pulse generator which provides pulses at a repetition rate much lower than the natural frequency of the passive oscillatory circuit; and a frequency detector circuit mounted on the vehicle having a receiver coil positioned adjacent the outside of the tire opposite the coil of the passive oscillatory circuit, the frequency detector circuit including a frequency to analogue convertor to produce an analogue signal corresponding to the tire pressure.

* * * * *